(12) United States Patent
Imoto et al.

(10) Patent No.: US 9,994,189 B2
(45) Date of Patent: Jun. 12, 2018

(54) GAS GENERATOR

(71) Applicant: Daicel Corporation, Osaka-shi, Osaka (JP)

(72) Inventors: Katsuhiro Imoto, Tatsuno (JP); Teppei Hanano, Tatsuno (JP); Haruhiko Yamashita, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days. days.

(21) Appl. No.: 14/917,840

(22) PCT Filed: Sep. 24, 2014

(86) PCT No.: PCT/JP2014/075204
§ 371 (c)(1),
(2) Date: Mar. 9, 2016

(87) PCT Pub. No.: WO2015/053077
PCT Pub. Date: Apr. 16, 2015

(65) Prior Publication Data
US 2016/0214564 A1    Jul. 28, 2016

(30) Foreign Application Priority Data
Oct. 11, 2013  (JP) .................................. 2013-213642

(51) Int. Cl.
*B60R 21/264*    (2006.01)
(52) U.S. Cl.
CPC ........ *B60R 21/264* (2013.01); *B60R 21/2644* (2013.01); *B60R 2021/2648* (2013.01)
(58) Field of Classification Search
CPC ... B60R 21/26; B60R 21/264; B60R 21/2644; B60R 2021/2648; B60R 2021/2642
(Continued)

(56) References Cited

U.S. PATENT DOCUMENTS

| 5,944,343 A | 8/1999 | Vitek et al. |
| 6,095,559 A | 8/2000 | Smith et al. |

(Continued)

FOREIGN PATENT DOCUMENTS

| DE | 20 2006 004 008 U1 | 8/2006 |
| JP | 2001-97176 A | 4/2001 |

(Continued)

OTHER PUBLICATIONS

English translation of International Preliminary Report on Patentability and Written Opinion issued in PCT International Application No. PCT/JP2014/075204 on Apr. 12, 2016.

(Continued)

*Primary Examiner* — James S Bergin
(74) *Attorney, Agent, or Firm* — Birch, Stewart, Kolasch & Birch, LLP

(57) ABSTRACT

The present invention provides a gas generator wherein a diffuser portion having a gas discharge port is disposed at one end of a cylindrical housing; an ignition device is disposed at the other end of the cylindrical housing; an axially-movable metallic partition wall having a plurality of through-holes is disposed between the ignition device and the diffuser portion; a space between the partition wall and the ignition device is an ignition device chamber charged with a molded article of a first gas generating agent; a space between the partition wall and the diffuser portion is a combustion chamber charged with a molded article of a second gas generating agent; the partition wall has a circular bottom surface and an annular wall extending, in a single direction, perpendicularly to an outer circumference of the circular bottom surface, and the circular bottom surface is disposed so as to be on the diffuser portion side; the ignition device has an igniter having a disk-shaped ignition portion protruding toward the partition wall and a metallic annular (Continued)

member having an annular wall and disposed around the ignition portion; and the annular wall of the annular member protrudes to the partition wall further than the distal end surface of the ignition portion.

9 Claims, 3 Drawing Sheets

(58) Field of Classification Search
USPC .................. 102/530; 280/741, 736, 740
See application file for complete search history.

(56) References Cited

U.S. PATENT DOCUMENTS

| | | | |
|---|---|---|---|
| 6,155,600 | A | 12/2000 | Reynolds et al. |
| 6,237,498 | B1 | 5/2001 | Winterhalder et al. |
| 6,460,883 | B1 | 10/2002 | Nakashima et al. |
| 7,654,565 | B2* | 2/2010 | McCormick ........ B60R 21/2644 |
| | | | 280/736 |
| 8,052,169 | B2* | 11/2011 | Yano ..................... B60R 21/272 |
| | | | 280/737 |
| 2005/0189755 | A1 | 9/2005 | Numoto et al. |
| 2005/0194772 | A1 | 9/2005 | Numoto et al. |
| 2006/0249938 | A1 | 11/2006 | Matsuda et al. |
| 2008/0042411 | A1 | 2/2008 | Hirooka et al. |
| 2009/0020032 | A1 | 1/2009 | Trevillyan |
| 2010/0109295 | A1* | 5/2010 | McCormick ........ B60R 21/2644 |
| | | | 280/728.1 |
| 2010/0269726 | A1 | 10/2010 | Jung et al. |
| 2011/0018243 | A1 | 1/2011 | Yano et al. |

FOREIGN PATENT DOCUMENTS

| | | | |
|---|---|---|---|
| JP | 2001-514991 | A | 9/2001 |
| JP | 2005-238907 | A | 9/2005 |
| JP | 2008-297988 | A | 11/2006 |
| JP | 2007-314050 | A | 12/2007 |
| JP | 2008-132842 | A | 6/2008 |
| JP | 2008-290528 | A | 12/2008 |
| JP | 2008-546513 | A | 12/2008 |
| JP | 2011-523919 | A | 8/2011 |
| WO | WO 2006/130848 | A2 | 12/2006 |
| WO | WO 2009/077109 | A1 | 6/2009 |
| WO | WO 2011/096345 | A1 | 8/2011 |

OTHER PUBLICATIONS

International Search Report issued in PCT/JP2014/075204, dated Jan. 6, 2015.
Written Opinion of the International Searching Authority issued in PCT/JP2014/075204, dated Jan. 6, 2015.

* cited by examiner

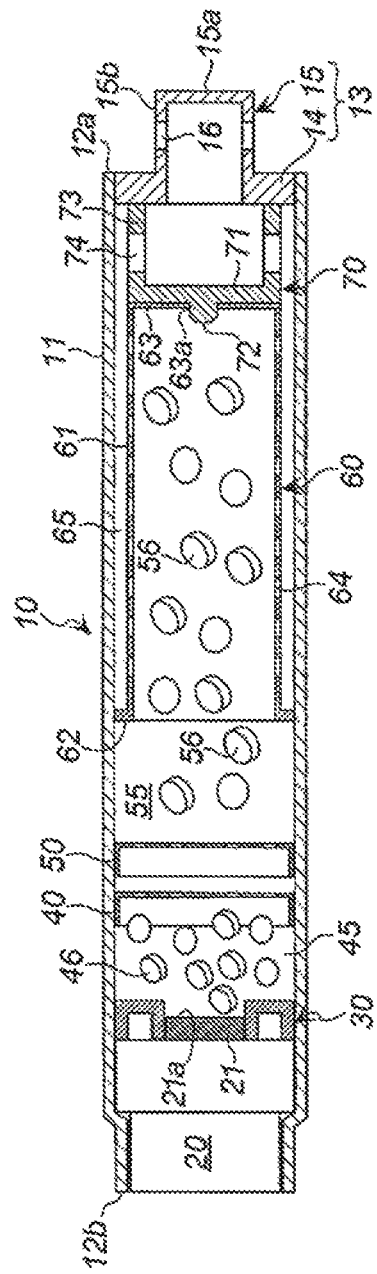
[Fig. 1]

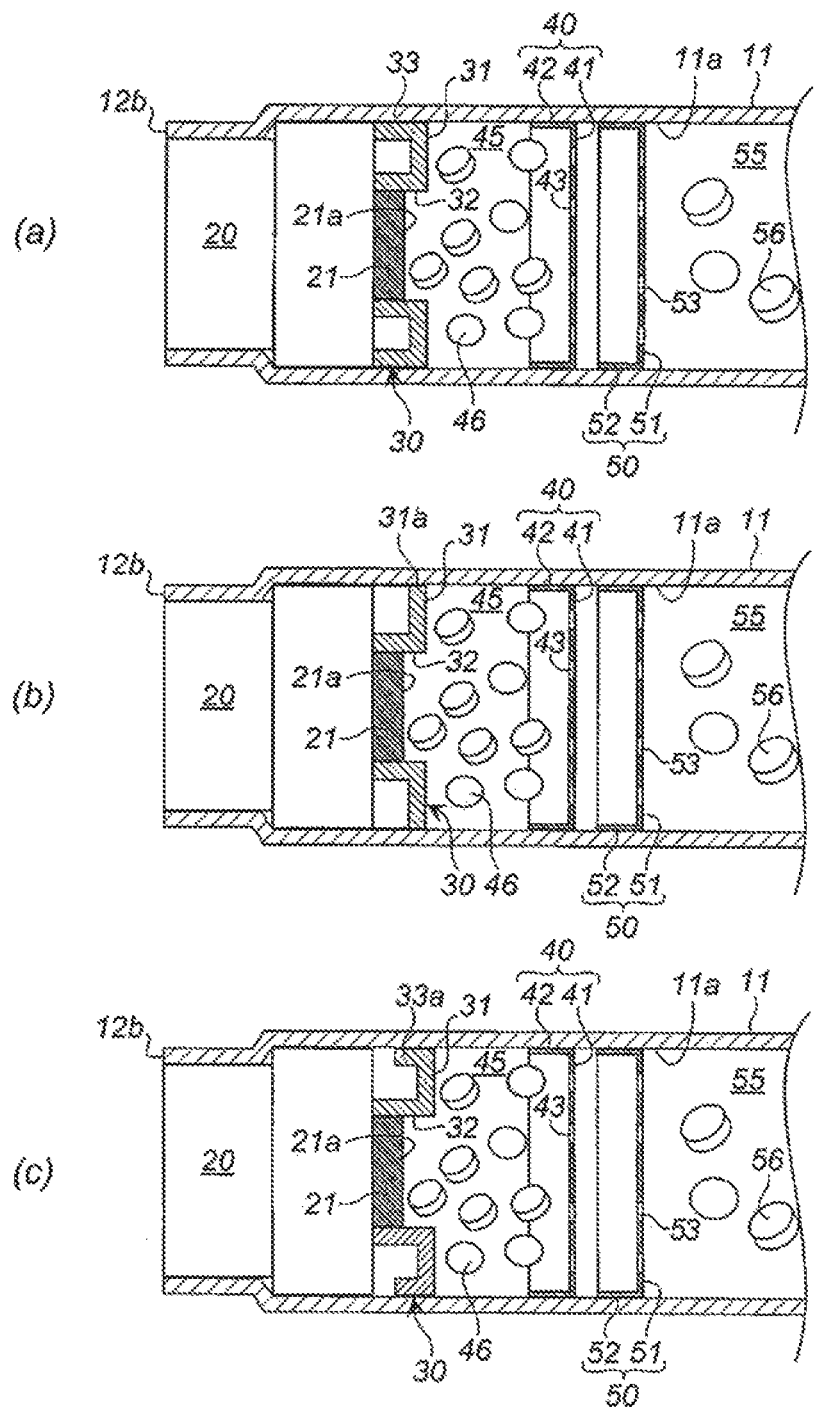
[Fig. 2]

[Fig. 3]
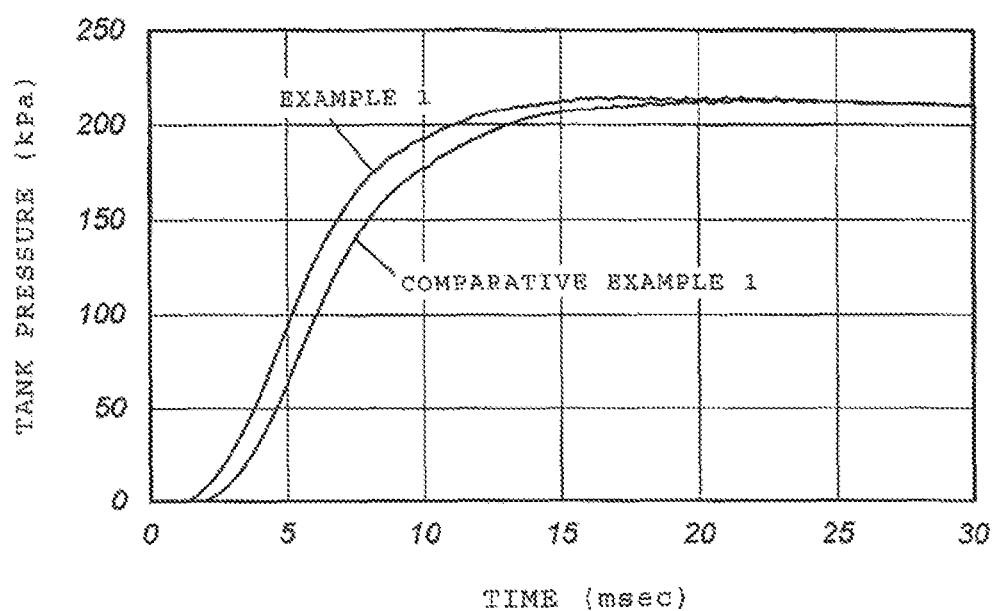

GAS GENERATOR

TECHNICAL FIELD

The present invention relates to a gas generator used for an airbag apparatus to be installed on an automobile.

DESCRIPTION OF RELATED ART

In gas generators in which a gas generating agent serves as a gas source, an elongated cylindrical housing is generally used.

When such a cylindrical housing is used, a combustion chamber charged with a gas generating agent also has an elongated shape. Accordingly, charging operability of the gas generating agent is also important, in addition to combustibility of the gas generating agent.

FIG. 1 of U.S. Pat. No. 6,237,498 shows a gas generator in which a flame-transferring tube (a storage portion 17) protrudes into a combustion chamber (a storage space 7) charged with a gas generating agent. An opening is formed in a surface of the flame-transferring tube. Therefore, the gas generating agent inside the combustion chamber is set such that the gas generating agent at a position facing the opening of the flame-transferring tube is initially burned and the gas generating agent located around the flame-transferring tube is burned later, that is, the entire gas generating agent burns with a difference in time.

JP-A No. 2008-290528 discloses a gas generator in which an igniter 30 with a protruding ignition portion is covered with a cup-shaped member 40, and a powdered transfer charge 45 is charged into the cup-shaped member 40. In such a gas generator, an ignition chamber 14 and a combustion chamber 15 are sectioned by a cushion material 61. Therefore, at the time of assembling, a capacity of the combustion chamber 15 is adjusted by axially pressing the cushion material 61 with the igniter 30 and the cup-shaped member 40.

DE-U No. 202006004008 discloses a gas generator in which an annular member is disposed around the ignition portion of an igniter, the annular member being a cushion material formed of a thermoplastic elastomer. However, the cushion material formed of a thermoplastic elastomer will apparently burn when the igniter is activated.

SUMMARY OF INVENTION

The present invention provides a gas generator including
a diffuser portion provided with a gas discharge port and disposed at one end of a cylindrical housing,
an ignition device disposed at the other end of the cylindrical housing,
an axially-movable metallic partition wall having a plurality of through-holes and disposed between the ignition device and the diffuser portion,
an ignition device chamber being a space between the partition wall and the ignition device and charged with a molded article of a first gas generating agent,
a combustion chamber being a space between the partition wall and the diffuser portion and charged with a molded article of a second gas generating agent,
the partition wall including a circular bottom surface and an annular wall extending, in a single direction, perpendicularly to an outer circumference of the circular bottom surface, the circular bottom surface being disposed to be on the diffuser portion side,
the ignition device including an igniter having a disk-shaped ignition portion which protrudes toward the partition wall, and a metallic annular member having an annular wall and disposed around the ignition portion,
the annular wall of the annular member protruding to the partition wall further than a distal end surface of the ignition portion.

BRIEF DESCRIPTION OF DRAWINGS

The present invention will become more fully understood from the detailed description given hereinbelow and the accompanying drawings which are given by way of illustration only, and thus are no limitative of the present invention and wherein:

FIG. 1 shows a cross-sectional view in the axial direction of a gas generator according to the present invention;

FIG. 2 shows, in (a), a partial enlarged view of the gas generator shown in FIG. 1, in (b), a partial enlarged view of a gas generator which is another embodiment of the gas generator shown in FIG. 1, in (c), a partial enlarged view of a gas generator which is yet another embodiment of the gas generator shown in FIG. 1; and FIG. 3 shows the results of a 60-liter tank combustion test obtained in Example 1 and Comparative Example 1.

DETAILED DESCRIPTION OF INVENTION

The present invention provides a gas generator with good ignition ability of a molded article of a gas generating agent.

In the gas generator according to the present invention, the ignition ability and the charging ability of the molded article of the first gas generating agent inside an ignition device chamber are improved by a combination of a metallic partition wall movable in the axial direction and a metallic annular member disposed around the ignition portion of the igniter.

The partition wall is disposed inside the cylindrical housing and serves to partition the ignition device chamber and the combustion chamber. Accordingly, it is not required to be as strong and durable as the cylindrical housing, and a smaller thickness of the partition wall is desirable from the standpoint of reducing the gas generator in weight.

The ignition device includes a combination of the annular member and an electric igniter which is used in known gas generators.

In the electric igniter, an igniter main body is enclosed in a retaining member formed by a resin and a metal collar, and a portion including the distal end surface of the disk-shaped ignition portion protrudes from the retaining member.

The molded article of the first gas generating agent acts to advance ignition and combustion of the molded article of the second gas generating agent by generating a combustion gas, and the combustion gas generated by combustion of the molded article of the first gas generating agent is also used, together with the combustion gas generated by the combustion of the molded article of the second gas generating agent, for inflating the airbag.

A gas generating agent for a known gas generator can be used as both of the molded article of the first gas generating agent and the molded article of the second gas generating agent, but preferably, for the molded article of the first gas generating agent, a gas generating agent with a relatively high combustion temperature is used and for the molded article of the second gas generating agent, a gas generating agent with a relatively low combustion temperature is used.

With the metallic annular member disposed around the circumference of the ignition portion of the igniter, since the annular wall thereof protrudes to the partition wall further than the distal end surface of the ignition portion, a flame and a high-temperature gas generated from the ignition portion are released and expanded easily inside the combustion chamber, and the flame and the gas reach the combustion chamber easily, thereby enhancing the ignition ability of the molded article of the first gas generating agent.

The present invention includes the following preferred aspects.

The aspect 1 of the present invention provides a gas generator a gas generator including a diffuser portion provided with a gas discharge port and disposed at one end of a cylindrical housing, an ignition device disposed at the other end of the cylindrical housing, an axially-movable metallic partition wall having a plurality of through-holes and disposed between the ignition device and the diffuser portion, an ignition device chamber being a space between the partition wall and the ignition device and charged with a molded article of a first gas generating agent, a combustion chamber being a space between the partition wall and the diffuser portion and charged with a molded article of a second gas generating agent, the partition wall including a circular bottom surface and an annular wall extending, in a single direction, perpendicularly to an outer circumference of the circular bottom surface, the circular bottom surface being disposed to be on the diffuser portion side, the ignition device including an igniter having a disk-shaped ignition portion which protrudes toward the partition wall, and a metallic annular member having an annular wall and disposed around the ignition portion, the annular member including:

an annular bottom surface, an inner annular wall extending perpendicularly to an inner circumference of the annular bottom surface, and an outer annular wall extending perpendicularly to an outer circumference of the annular bottom surface, the inner annular wall and the outer annular wall having the same length;

the inner annular wall abutted against the ignition portion, the outer annular wall abutted against an inner wall surface of the cylindrical housing, and the annular bottom surface disposed to be on the partition wall side; and the annular bottom surface protruding to the partition wall further than the distal end surface of the ignition portion.

The aspect 2 of the present invention provides a gas generator including a diffuser portion provided with a gas discharge port and disposed at one end of a cylindrical housing, an ignition device disposed at the other end of the cylindrical housing, an axially-movable metallic partition wall having a plurality of through-holes and disposed between the ignition device and the diffuser portion, an ignition device chamber being a space between the partition wall and the ignition device and charged with a molded article of a first gas generating agent, a combustion chamber being a space between the partition wall and the diffuser portion and charged with a molded article of a second gas generating agent, the partition wall including a circular bottom surface and an annular wall extending, in a single direction, perpendicularly to an outer circumference of the circular bottom surface, the circular bottom surface being disposed to be on the diffuser portion side, the ignition device including an igniter having a disk-shaped ignition portion which protrudes toward the partition wall, and a metallic annular member having an annular wall and disposed around the ignition portion, the annular member including:

an annular bottom surface and an inner annular wall extending perpendicularly to an inner circumference of the annular bottom surface;

the inner annular wall abutted against the ignition portion, an outer circumferential edge portion of the annular bottom surface abutted against an inner wall surface of the cylindrical housing, and the annular bottom surface disposed to be on the partition wall side; and the annular bottom surface protruding to the partition wall further than the distal end surface of the ignition portion.

The aspect 3 of the present invention provides a gas generator including a diffuser portion provided with a gas discharge port and disposed at one end of a cylindrical housing, an ignition device disposed at the other end of the cylindrical housing, an axially-movable metallic partition wall having a plurality of through-holes and disposed between the ignition device and the diffuser portion, an ignition device chamber being a space between the partition wall and the ignition device and charged with a molded article of a first gas generating agent, a combustion chamber being a space between the partition wall and the diffuser portion and charged with a molded article of a second gas generating agent, the partition wall including a circular bottom surface and an annular wall extending, in a single direction, perpendicularly to an outer circumference of the circular bottom surface, the circular bottom surface being disposed to be on the diffuser portion side, the ignition device including an igniter having a disk-shaped ignition portion which protrudes toward the partition wall, and a metallic annular member having an annular wall and disposed around the ignition portion, the annular member including, an annular bottom surface, an inner annular wall extending perpendicularly to an inner circumference of the annular bottom surface, and an outer annular wall extending perpendicularly to an outer circumference of the annular bottom surface, the inner annular wall and the outer annular wall having different lengths;

the inner annular wall abutted against the ignition portion, the outer annular wall abutted against an inner wall surface of the cylindrical housing, and the annular bottom surface disposed to be on the partition wall side; and the annular bottom surface protruding to the partition wall further than the distal end surface of the ignition portion.

The metallic annular member can be in any shape as long as it can be disposed around the ignition portion and the annular wall thereof protrudes to the partition wall further than the distal end surface of the ignition portion. As the metallic annular member, the first annular member to the third annular member described hereinbelow are used, however, the metallic annular member is not limited thereto.

(First Annular Member)

The first annular member has an annular bottom surface, an inner annular wall extending perpendicularly to an inner circumference of the annular bottom surface, and an outer annular wall extending perpendicularly to an outer circumference of the annular bottom surface, the inner annular wall and the outer annular wall having the same length.

(Second Annular Member)

The second annular member has an annular bottom surface and an inner annular wall extending perpendicularly to an inner circumference of the annular bottom surface.

The second annular member is the same as the first annular member, except that the outer annular wall is not provided.

(Third Annular Member)

The third annular member has an annular bottom surface, an inner annular wall extending perpendicularly to an inner circumference of the annular bottom surface, and an outer annular wall extending perpendicularly to an outer circumference of the annular bottom surface, the inner annular wall and the outer annular wall having different lengths.

The third annular member is the same as the first annular member, except that the inner annular wall and the outer annular wall have different lengths. It is preferred that the length of the inner annular wall is larger than that of the outer annular wall.

The first annular member to the third annular member are arranged such that when they are disposed around the ignition portion of the igniter, the annular wall of each annular member protrudes to the partition wall further than the distal end surface of the ignition portion.

Further, as a result of using the combination of the ignition device and the partition wall of the present invention, assembling operability is also improved. When the assembling operability is needed to be improved, a combination of the igniter and the above-described first annular member to third annular member is used as the ignition device.

When assembling the gas generator using the cylindrical housing, initially, the diffuser portion is fixed to the opening at one end of the cylindrical housing, and then the necessary components are mounted by press-fitting or inserting from the other opening, a predetermined amount of the molded articles of the second gas generating agent is charged, the partition wall is press-fitted, and a predetermined amount of the molded articles of the first gas generating agent is charged.

When the ignition device is finally inserted into the cylindrical housing, the molded articles of the first gas generating agent which have been earlier charged are pushed in the axial direction.

Where a gap is present between the molded articles of the gas generating agent, the molded articles of the gas generating agent repeatedly collide with each other under the effect of vibrations applied over a long period of time and can be partially pulverized. Therefore, it is important that the pushing operation is performed such that no gaps appear between the molded articles of the gas generating agent.

And where a gap is present between the cylindrical housing and the molded articles of the gas generating agent, the cylindrical housing and the molded articles of the gas generating agent collide with each other, which causes abnormal noises. Also in view of the above, it is important that the pushing operation of the molded articles of the gas generating agent is important.

Where the ignition device including the first annular member to the third annular member is used, in the above-mentioned pushing operation, the molded articles of the first gas generating agent inside the ignition device chamber are uniformly pushed. Therefore, the operation of inserting the ignition device (the igniter and the annular member) and the operation of pushing the molded articles of the first gas generating agent are facilitated.

Where none of the first annular member to the third annular member is present, the molded articles of the first gas generating agent are pushed mainly by the protruding ignition portion. As a result, the molded articles of the first gas generating agent are difficult to push uniformly. Therefore, the operation of pushing the molded articles of the first gas generating agent is performed unevenly. And when the partition wall has a small thickness (that is, the strength is small), the non-uniform pushing can cause deformation or displacement.

The aspect 4 of the present invention provides a gas generator including a diffuser portion provided with a gas discharge port and disposed at one end of a cylindrical housing, an ignition device disposed at the other end of the cylindrical housing, an axially-movable metallic partition wall having a plurality of through-holes and disposed between the ignition device and the diffuser portion, an ignition device chamber being a space between the partition wall and the ignition device and charged with a molded article of a first gas generating agent, a combustion chamber being a space between the partition wall and the diffuser portion and charged with a molded article of a second gas generating agent, the partition wall including a circular bottom surface and an annular wall extending, in a single direction, perpendicularly to an outer circumference of the circular bottom surface, the circular bottom surface being disposed to be on the diffuser portion side, the partition wall including a combination of a metallic first partition wall having a plurality of through-holes and a metallic second partition wall having a plurality of through-holes, the first partition wall and the second partition wall each having a circular bottom surface and an annular wall extending, in a single direction, perpendicularly to an outer circumference of the circular bottom surface, the first partition wall being disposed on the ignition device chamber side, the second partition wall being disposed on the combustion chamber side, with each of the partition walls being disposed such that the circular bottom surface thereof is on the diffuser portion side, a capacity of the ignition device chamber being adjusted according to a charged amount of the molded article of the first gas generating agent by moving the first partition wall in the axial direction, a capacity of the combustion chamber being adjusted according to a charged amount of the molded article of the second gas generating agent by moving the second partition wall in the axial direction, the ignition device including an igniter having a disk-shaped ignition portion which protrudes toward the partition wall, and a metallic annular member having an annular wall and disposed around the ignition portion, the annular wall of the annular member protruding to the partition wall further than a distal end surface of the ignition portion.

A required amount of generated gas may vary according to the location of the gas generator in a vehicle and a vehicle type. Such a variation can be met by changing an amount of the gas generating agent charged into the gas generator, without changing the gas generator itself.

Accordingly, by using two partition walls, namely, the first partition wall and the second partition wall, a capacity of each chamber is finely adjusted in accordance with an amount of the molded article of the first gas generating agent charged in the ignition device chamber and an amount of the molded article of the second gas generating agent charged in the combustion chamber respectively.

With the gas generator of the present invention, the ignition ability of the molded article of the first gas generating agent charged in the ignition device chamber is improved and operability at the time of assembling is also improved.

DESCRIPTION OF EMBODIMENTS

An embodiment of the present invention will be described with reference to FIGS. 1 and 2. FIG. 1 shows a cross-sectional view in the axial direction of a gas generator according to the present invention. FIG. 2 shows a partial enlarged view of the gas generator shown in FIG. 1.

In a gas generator 10, a cylindrical housing 11 is an outer shell container.

A diffuser portion 13 having a gas discharge port 16 is disposed at one end 12a of the cylindrical housing 11. The gas discharge port 16 is closed from the inner side with an aluminum tape which is not depicted in the drawing.

The diffuser portion 13 includes a cup portion 15 having a bottom surface 15a and a circumferential surface 15b, and a flange portion 14 faulted at the opening of the cup portion 15.

The diffuser portion 13 is fixed by welding at the contact portion of the circumferential surface 15b of the cup portion and an inner wall surface 11a at the one end 12a of the cylindrical housing 11.

The cylindrical housing 11 and the diffuser portion 13 are formed of the same metal such as stainless steel, iron, and aluminum.

An ignition device is disposed at the other end 12b of the cylindrical housing 11, and two partition walls (a first partition wall 40 and a second partition wall 50) are disposed between the diffuser portion 13 and the ignition device.

The ignition device includes a combination of an annular member 30 and an electric igniter 20 for a known gas generator.

In the electric igniter 20, the igniter is enclosed in a retaining member including a resin and a metal collar, and a disk-shaped ignition portion 21 protrudes to the first partition wall 40.

The metallic annular member 30 is disposed around the disk-shaped ignition portion 21. The annular member 30 may be formed of a metal same as that of the cylindrical housing 11 or of a different metal.

The annular member (the first annular member) 30 depicted in (a) in FIG. 2 has an annular bottom surface 31, an inner annular wall 32 extending perpendicularly to the inner circumference of the annular bottom surface 31, and an outer annular wall extending perpendicularly to the outer circumference of the annular bottom surface 31.

The inner annular wall 32 is abutted against the ignition portion 21, the outer annular wall 33 is abutted against an inner wall surface 11a of the cylindrical housing 11, and the annular bottom surface 31 is disposed to be on the first partition wall 40 side.

The annular member 30 is press-fitted between the inner wall surface 11a of the cylindrical housing and the ignition portion 21, and the annular bottom surface 31 protrudes to the first wall partition 40 side further than a distal end surface 21a of the ignition portion.

In (a) in FIG. 2, the arrangement can be reversed in the axial direction such that the annular bottom surface 31 abuts against the igniter 20, and an opening between the inner annular wall 32 and the outer annular wall 33 faces the first partition wall 40. With such an arrangement, the inner annular wall 32 still protrudes to the first partition wall 40 side further than the distal end surface 21a of the ignition portion. Therefore, the operation can be performed in the same manner as with the arrangement such as depicted in (a) in FIG. 2.

The first partition wall 40 has a circular bottom surface 41 and an annular wall 42 extending, in a single direction, perpendicularly to the outer circumference of the circular bottom surface 41. A plurality of first through-holes 43 are formed in the circular bottom surface 41.

The first partition wall 40 may be formed of the same metal as that of the cylindrical housing 11 or of a different metal. Unlike the cylindrical housing 11, pressure resistance is not required, and therefore, from the standpoint of weight reduction, the first partition wall 40 is desirably reduced in thickness and preferably formed of aluminum.

The first partition wall 40 is press-fitted to the cylindrical housing 11 such that the circular bottom surface 41 is on the diffuser portion 13 side.

The annular member 30 depicted in (b) in FIG. 2 can be used instead of that depicted in (a) in FIG. 2.

The annular member (the second annular member) depicted in (b) in FIG. 2 is the same as the annular member 30 depicted in (a) in FIG. 2, except that no outer annular wall 33 is provided.

In (b) in FIG. 2, an outer circumferential edge 31a of the annular bottom surface 31 is press-fitted against the inner wall surface 11a of the cylindrical housing.

Further, in (b) in FIG. 2, the arrangement can be reversed in the axial direction such that the annular bottom surface 31 is abutted against the igniter 20, and the inner annular wall 32 is on the first partition wall 40 side. With such an arrangement, the inner annular wall 32 still protrudes to the first partition wall 40 further than the distal end surface 21a of the ignition portion. Therefore, the operation can be performed in the same manner as with the arrangement such as depicted in (b) in FIG. 2.

The annular member 30 depicted in (c) in FIG. 2 can be used instead of that depicted in (a) in FIG. 2.

In the annular member (the third annular member) 30 depicted in (c) in FIG. 2, the length of an outer annular wall 33a is less than that of the outer annular wall 33 in the annular member 30 depicted in (a) in FIG. 2, other features being the same.

Further, in (c) in FIG. 2, the arrangement can be reversed in the axial direction such that the annular bottom surface 31 is abutted against the igniter 20, and the opening between the inner annular wall 32 and the outer annular wall 33 faces the first partition wall 40. With such an arrangement, the inner annular wall 32 still protrudes to the first partition wall 40 further than the distal end surface 21a of the ignition portion. Therefore, the operation can be performed in the same manner as with the arrangement such as depicted in (c) in FIG. 2.

The annular members depicted in (a) to (c) in FIG. 2 is hollow to reduce weight, but an annular member that is not hollow can be also used.

The space between the igniter 20, the annular member 30, and the first partition wall 40 serves as an ignition device chamber 45, and a predetermined amount of molded articles of a first gas generating agent 46 is charged into the ignition device chamber 45. The molded article of the first gas generating agent 46 depicted in the drawings has a disk-like shape, but it can have any desirable shape, for example, a round columnar shape.

Since the first partition wall 40 is movable in the axial direction of an inflator 10, a capacity of the ignition device chamber 45 can be adjusted according to a charged amount of the molded articles of the first gas generating agent 46.

The second partition wall 50 has a circular bottom surface 51 and an annular wall 52 extending, in a single direction, perpendicularly to the outer circumference of the circular bottom surface 51. A plurality of second through-holes 53 are formed in the circular bottom surface 51.

The second partition wall 50 may be formed of the same metal as that of the cylindrical housing 11 or of a different metal. Unlike the cylindrical housing 11, pressure resistance is not required, and therefore, from the standpoint of weight reduction, the second partition wall 50 is desirably reduced in thickness and preferably formed of aluminum.

The second partition wall 50 is press-fitted into the cylindrical housing 11 such that the circular bottom surface 51 is on the diffuser portion 13 side.

The space between the second partition wall 50 and the diffuser portion 13 serves as a combustion chamber 55, and a predetermined amount of the molded articles of the second gas generating agent 56 is charged into the combustion chamber 55. The molded article of the second gas generating agent 56 depicted in the drawings has a disk-like shape, but it can have any desirable shape, for example, a round columnar shape.

Since the second partition wall 50 is movable in the axial direction of an inflator 10, a capacity of the combustion chamber 55 can be adjusted according to a charged amount of the molded articles of the second gas generating agent 56.

The annular wall 42 of the first partition wall 40 and the annular wall 52 of the second partition wall 50 may have the same or different lengths.

In the drawings, the molded articles of the second gas generating agent 56 in the combustion chamber 55 are charged without gaps by being pushed in the axial direction by the second partition wall 50, and the molded articles of the first gas generating agent 46 in the ignition device chamber 45 are charged without gaps by being held between the ignition device and the first partition wall 40.

In the state depicted in the drawings, the annular wall 50 can be abutted against the circular bottom surface 51 of the first partition wall 40 by adjusting the length of the annular wall 52 of the second partition wall 50.

The molded article of the first gas generating agent 46 and the molded article of the second gas generating agent 56 may be the same or different.

When the molded article of the first gas generating agent 46 and the molded article of the second gas generating agent 56 are made to differ from each other, the molded article of the first gas generating agent 46 has a relatively high combustion temperature and the molded article of the second gas generating agent 56 has a relatively low combustion temperature.

For example, as the gas generating agents, which satisfy the above relationship of the combustion temperature, the gas generating agents having different combustion temperatures disclosed in the paragraphs 0040 to 0042 in JP-A No. 2008-132842, and the gas generating agents having different combustion temperatures disclosed in the paragraphs 0032 to 0033 in JP-A No. 2005-238907 can be employed.

In the gas generator 10 depicted in FIG. 1, a first cup member 60 and a second cup member 70 are disposed in combination inside the combustion chamber 55, but the arrangement is not limited to this embodiment. For example, a known coolant/filter for a gas generator may be disposed in a gas discharge path leading to the diffuser portion 13, instead of using the combination of the first cup member 60 and the second cup member 70.

The first cup member 60 includes a bottom surface 63 having a through-hole 63*a*, a circumferential wall 61, and a flange portion 62 formed at an opening.

A large number of first gas passage holes 64 serving as passage holes for the combustion gas generated inside the combustion chamber 55 are provided in the circumferential wall 61.

The second cup member 70 has a bottom surface 71 having a protrusion 72, a circumferential wall 73, and a plurality of second gas passage holes 74 formed in the circumferential wall 73.

The first cup member 60 and the second cup member 70 are fixed in the following manner.

An opening of the second cup member 70 is abutted against a flange portion 14 of the diffuser portion.

The first cup member 60 is fixed in a state in which the through-hole 63*a* of the bottom surface 63 is fitted onto a protrusion 72 of the bottom surface 71 of the second cup member, and the flange portion is press-fitted against the inner wall surface 11*a* of the cylindrical housing 11. The second cup member 70 is fixed by being held at axial both sides by the first cup member 60 and the diffuser portion 13.

The first cup member 60 and the second cup member 70 have the same outer diameter which is adjusted to be less than the inner diameter of the cylindrical housing 11. Thereby, a cylindrical gap 65 serving as a combustion gas passage is formed.

A method for assembling the gas generator 10 depicted in FIG. 1 is described hereinbelow. Any of the annular members 30 depicted in (a) to (c) in FIG. 2 can be used in this process.

Initially, the diffuser portion 13 is disposed in the opening of the cylindrical housing 11 at the one end 12*a* thereof, and the diffuser portion 13 and the cylindrical housing 11 are then fixed by welding.

Then, the through-hole 63*a* is fitted onto and fixed to the protrusion 72 while press-fitting the combination of the first cup member 60 and the second cup member 70 from the opening on the other end 12*b* (at this stage, the cylindrical housing 11 has a uniform diameter from the one end 12*a* to the other end 12*b*).

Then, a predetermined amount of the molded articles of the second gas generating agent 56 is charged into the combustion chamber 55 from the opening at the other end 12*b*.

The second partition wall 50 is then press-fitted from the opening at the other end 12*b* to adjust a capacity of the combustion chamber 55 such that the molded articles of the second gas generating agent 56 in the combustion chamber 55 are charged without gaps.

The first partition wall 40 is then press-fitted from the opening at the other end 12*b*.

A predetermined amount of the molded articles of the first gas generating agent 46 is then charged into the ignition device chamber 45 from the opening at the other end 12*b*.

Then, the ignition device (the igniter 20 and one of the first annular member 30 to the third annular member 30 depicted in (a) to (c) in FIG. 2) is press-fitted from the opening at the other end 12*b*. At this time, the molded articles of the first gas generating agent 46 are uniformly pushed in, and a pressure is also uniformly received by the first partition wall 40 through the molded articles of the first gas generating agent 46.

Thereby, the molded articles of the first gas generating agent 46 are not unevenly located inside the ignition device chamber 45, the first partition wall 40 is not deformed, and the first partition wall 40 is not displaced.

When the first annular member 30 to the third annular member 30 depicted in (a) to (c) in FIG. 2 are arranged in such a manner that the axial orientation thereof is reversed, uniform pushing operability is degraded. Therefore, when a uniform pushing effect is also needed to be obtained, the annular members are used in the states depicted in (a) to (c) in FIG. 2.

The end 12b of cylindrical housing 11 is then crimped (deformed such that the diameter thereof is reduced, as depicted in the drawings), and the igniter 20 is fixed.

The operation of the gas generator 10 depicted in FIG. 1 is explained hereinbelow.

When the igniter 20 is activated, a flame or a high-temperature gas is generated from the ignition portion 21. At this time, by the annular member 30, the flame or the high-temperature gas is released to expand inside the ignition device chamber 45 and part thereof also reaches the interior of the combustion chamber 55. As a result, the ignition ability of the molded articles of the first gas generating agent 46 and the molded articles of the second gas generating agent 56 is improved.

The combustion gas, generated by ignition and combustion of the molded articles of the first gas generating agent 46 inside the ignition device chamber 45, flows out from the first through-holes 43 of the first partition wall 40 and then flows from the second through-holes 53 of the second partition wall 50 into the combustion chamber 55.

The ignition and combustion of the molded articles of the second gas generating agent 56 in the combustion chamber 55 has already started, but the combustion is further advanced by the combustion gas flowing into the combustion chamber 55, and new combustion gas is generated therein.

The combustion gas generated in the combustion chamber 55 enters the cylindrical gap 65 from the first gas passage holes 64 of the first cup member 60, enters the interior of the second cup member 70 from the second gas passage holes 74 of the second cup member 70, and then enters the interior of the diffuser portion 13 and ruptures the seal tape to be discharged from the gas discharge port 16.

EXAMPLES

Example 1 and Comparative Example 1

With the gas generator depicted in FIG. 1 (Example 1) and the gas generator obtained by removing the annular member 30 from the gas generator depicted in FIG. 1 (Comparative Example 1), a known 60-liter tank combustion test (see, for example, JP-A No. 2001-97176, paragraph 0098) was conducted.

In both of the gas generators, the compositions and amounts of the molded articles of the gas generating agents that were charged into the ignition device chamber and combustion chamber were the same, and the molded articles of gas generating agents were charged such that no gaps appeared therebetween.

The results of a 60-liter tank combustion test are depicted in FIG. 3.

In Example 1, the time from the activation of the igniter to the start of pressure increase (start of gas generation) was 1.4 msec, in Comparative Example 1, the time was 2.4 msec, the difference between the two examples being 1 msec. In the usual airbag apparatus installed on a vehicle, the time after the collision of the vehicle till the maximum deployment of the air bag is about 30 msec to 60 msec. Therefore, the aforementioned difference of 1 msec is an extremely large difference.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a cylindrical housing having a first end and a second end opposite to the first end;
a diffuser portion provided with a gas discharge port and disposed at the first end of the cylindrical housing;
an ignition device disposed at the second end of the cylindrical housing,
a first partition wall having a plurality of through-holes and disposed between the ignition device and the diffuser portion;
an ignition device chamber defined by the first partition wall and the ignition device, and being charged with a molded article of a first gas generating agent;
a combustion chamber defined between the first partition wall and the diffuser portion, and being charged with a molded article of a second gas generating agent;
the first partition wall including a circular bottom surface and an annular wall, the annular wall extending in a single direction perpendicular to an outer circumference of the circular bottom surface, the circular bottom surface opposing the diffuser portion;
the ignition device including an igniter having a disk-shaped ignition portion which faces the first partition wall, and an annular member having an annular bottom surface wall and disposed around the ignition portion; and
a distance between the annular bottom surface of the annular member and the first partition wall is shorter than a distance between a distal end surface of the ignition portion and the first partition wall,
wherein the annular bottom surface of the annular member extends between the ignition portion of the igniter and the cylindrical housing, and the molded article of the first gas generating agent is disposed closer to the diffuser portion than the annular bottom surface.

2. The gas generator according to claim 1, wherein the annular member includes:
the annular bottom surface, an inner annular wall extending perpendicularly to an inner circumference of the annular bottom surface, and an outer annular wall extending perpendicularly to an outer circumference of the annular bottom surface, the inner annular wall and the outer annular wall having the same length; and
the inner annular wall abuts against the ignition portion, the outer annular wall abuts against an inner wall surface of the cylindrical housing, and the annular bottom surface opposes the first partition wall.

3. The gas generator according to claim 1, wherein the annular member includes:

the annular bottom surface and an inner annular wall extending perpendicularly to an inner circumference of the annular bottom surface; and the inner annular wall abuts against the ignition portion, an outer circumferential edge portion of the annular bottom surface abuts against an inner wall surface of the cylindrical housing, and the annular bottom surface opposes the first partition wall.

4. The gas generator according to claim 3 wherein the annular member only has the annular bottom surface and the inner annular wall.

5. The gas generator according to claim 1, wherein the annular member includes:

the annular bottom surface, an inner annular wall extending perpendicularly to an inner circumference of the annular bottom surface, and an outer annular wall extending perpendicularly to an outer circumference of the annular bottom surface, the inner annular wall and the outer annular wall having different lengths; and the inner annular wall abuts against the ignition portion, the outer annular wall abuts against an inner wall surface of the cylindrical housing, and the annular bottom surface opposes the first the partition wall.

6. The gas generator according to claim 5 wherein a length of the outer annular wall is shorter than a length of the inner annular wall.

7. The gas generator according to claim 1, further comprising:

a second partition wall having a plurality of through-holes and defining the combustion chamber, wherein the first partition wall and the second partition wall each has a circular bottom surface and an annular wall extending in a single direction perpendicular to an outer circumference of the circular bottom surface;

the first partition wall is disposed closer to the ignition device chamber than the second partition wall, with each of the first and second partition walls being disposed such that the circular bottom surface thereof opposes the diffuser portion;

a capacity of the ignition device chamber, corresponding to a charged amount of the molded article of the first gas generating agent, is determined by a position of the first partition wall in an axial direction of the cylindrical housing; and a capacity of the combustion chamber, corresponding to a charged amount of the molded article of the second gas generating agent, is determined by a position of the second partition wall in the axial direction.

8. The gas generator according to claim 1 wherein the annular member is press-fitted between the inner wall surface of the cylindrical housing and the ignition portion.

9. A gas generator, comprising:

a cylindrical housing having a first end and a second end opposite to the first end;

a diffuser portion provided with a gas discharge port and disposed at the first end of the cylindrical housing;

a partition wall having a plurality of through-holes and disposed between first end and the second end, the partition wall including a circular bottom surface provided with the through-holes;

an ignition device chamber defined by the partition wall and the second end, and being charged with a molded article of a first gas generating agent;

a combustion chamber defined between the partition wall and the diffuser portion, and being charged with a molded article of a second gas generating agent;

an ignition device including an igniter provided with an ignition portion and being disposed in the ignition device chamber at the second end of the cylindrical housing such that the ignition portion faces the partition wall;

an annular member having an annular bottom surface and disposed around the ignition portion such that a distance between the annular bottom surface and the partition wall is shorter than a distance between a distal end surface of the ignition portion and the partition wall, the annular bottom surface extending between the ignition portion and the cylindrical housing, and the molded article of the first gas generating agent is disposed closer to the diffuser potion than the annular bottom surface.

* * * * *